US009931698B2

(12) United States Patent
Yoshiba et al.

(10) Patent No.: US 9,931,698 B2
(45) Date of Patent: Apr. 3, 2018

(54) CUTTING INSERT FOR THREADING, TOOL BODY AND CUTTING TOOL

(71) Applicant: TUNGALOY CORPORATION, Iwaki-shi, Fukushima (JP)

(72) Inventors: Daisuke Yoshiba, Iwaki (JP); Eiichi Nunokawa, Iwaki (JP); Atsushi Ogawa, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 263 days.

(21) Appl. No.: 14/891,663

(22) PCT Filed: May 19, 2014

(86) PCT No.: PCT/JP2014/063259
§ 371 (c)(1),
(2) Date: Nov. 16, 2015

(87) PCT Pub. No.: WO2014/189018
PCT Pub. Date: Nov. 27, 2014

(65) Prior Publication Data
US 2016/0114399 A1    Apr. 28, 2016

(30) Foreign Application Priority Data
May 20, 2013   (JP) .................................. 2013-105992

(51) Int. Cl.
*B23B 27/06*   (2006.01)
*B23B 27/14*   (2006.01)

(52) U.S. Cl.
CPC .......... *B23B 27/065* (2013.01); *B23B 27/141* (2013.01); *B23B 27/145* (2013.01);
(Continued)

(58) Field of Classification Search
CPC ..... B23B 27/16; B23B 27/065; B23B 27/141; B23B 27/145; B23B 2200/0423;
(Continued)

(56) References Cited

U.S. PATENT DOCUMENTS 4,669,925 A * 6/1987 Lowe .................... B23B 27/065
407/113
4,913,604 A * 4/1990 Zaengerle ............. B23B 27/007
407/113
(Continued)

FOREIGN PATENT DOCUMENTS

DE    2637757 A1    2/1978
EP    0062621 A2    10/1982
(Continued)

OTHER PUBLICATIONS

Search report dated Jul. 1, 2014 issued in counterpart International (PCT) Application (No. PCT/JP2014/063259).

*Primary Examiner* — Daniel Howell
*Assistant Examiner* — Nicole N Ramos
(74) *Attorney, Agent, or Firm* — Studebaker & Brackett PC

(57) ABSTRACT

A cutting insert for threading of the present invention includes two opposing end surfaces and a peripheral side surface extending therebetween. The peripheral side surface has a first side surface portion and a second side surface portion arranged at different positions in a circumferential direction. A cutting edge is formed at an intersecting ridgeline portion between the first end surface and the first side surface portion and at least a portion of this cutting edge has a shape corresponding to a thread groove. The second side surface portion has an inclined portion which enlarges outward from the side of the first end surface toward the side of the second end surface. This inclined portion is config-
(Continued)

ured to engage with a side wall surface of a tool body so as to prevent floating of the cutting insert.

5 Claims, 14 Drawing Sheets

(52) U.S. Cl.
CPC .............. *B23B 2200/0423* (2013.01); *B23B 2200/0485* (2013.01); *B23B 2200/205* (2013.01); *B23B 2210/02* (2013.01)

(58) Field of Classification Search
CPC ...... B23B 2200/0485; B23B 2200/205; B23B 2210/02; B23G 5/00; B23G 5/08; B23G 5/10; B23G 5/14; B23G 5/18; B23G 2240/60; Y10T 407/172; Y10T 407/173; Y10T 407/22; Y10T 407/2228; Y10T 82/20; Y10T 408/904; Y10T 408/9044; Y10T 408/9046; Y10T 408/90467; Y10T 408/9048

USPC ...................... 470/10, 66, 80, 185, 187, 188
See application file for complete search history.

(56) References Cited

U.S. PATENT DOCUMENTS

| | | | |
|---|---|---|---|
| 5,549,425 A | 8/1996 | Bernadic et al. | |
| 6,224,299 B1* | 5/2001 | Frecska | B23G 5/182 407/41 |
| 6,682,271 B2* | 1/2004 | Kichin | B23G 5/18 407/24 |
| 2013/0108384 A1* | 5/2013 | Yoshiba | B23B 27/065 407/114 |

FOREIGN PATENT DOCUMENTS

| | | |
|---|---|---|
| JP | S58-154004 U | 10/1983 |
| JP | S60-99512 A | 6/1985 |
| JP | S62-53921 U | 4/1987 |
| JP | H02-107425 U | 8/1990 |

* cited by examiner

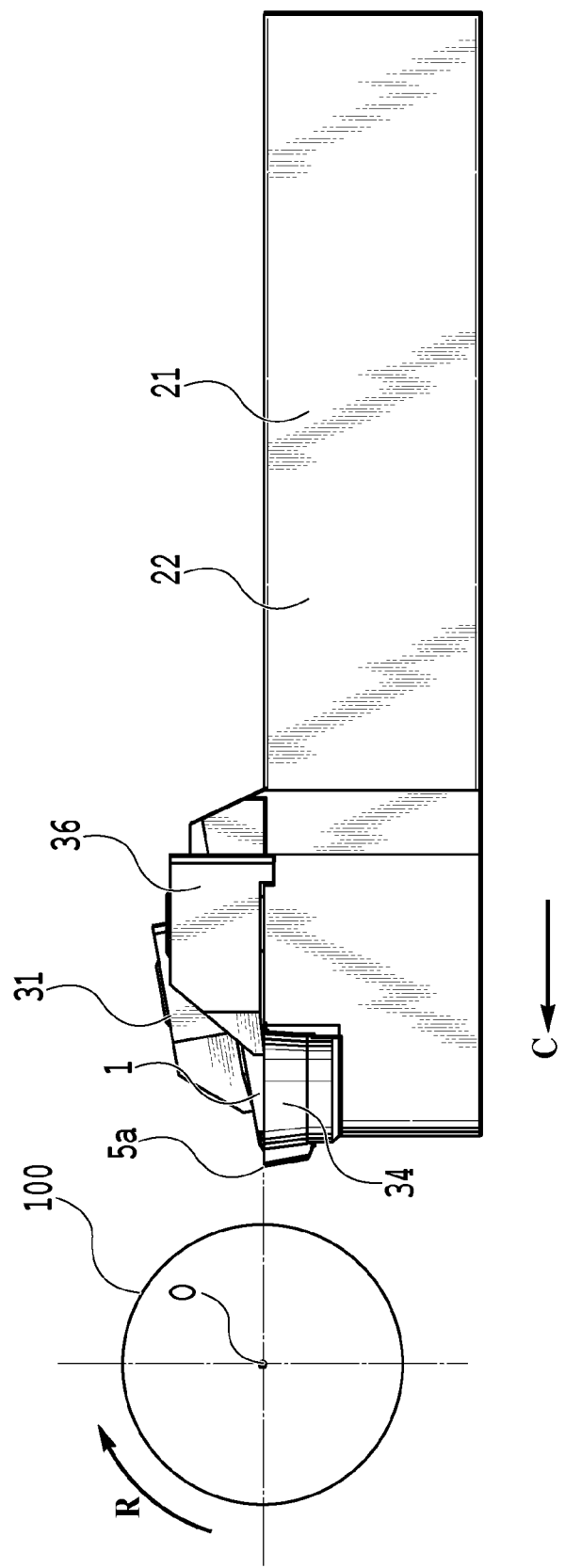

CUTTING INSERT FOR THREADING, TOOL BODY AND CUTTING TOOL

RELATED APPLICATIONS

This is a 371 US National Phase of International Patent Application No. PCT/JP2014/063259 filed May 19, 2014, and published as WO 2014/189018 on Nov. 27, 2014, which claims priority to JP 2013-105992, filed May 20, 2013. The contents of the aforementioned applications are incorporated by reference in their entirety.

TECHNICAL FIELD

The present invention relates to a cutting tool for threading. In particular, the present invention relates to a cutting insert for threading to be detachably mounted to the cutting tool for threading, a tool body to which this cutting insert is to be detachably mounted, and the cutting tool for threading.

BACKGROUND ART

As a conventional cutting insert for threading, there is the one as shown in Patent Literature 1. The cutting insert for threading of Patent Literature 1 has a square block shape and has two opposing end surfaces, three side surfaces which form right angles with these end surfaces, and a saw-tooth-like side surface. An even number of protruding portions of the saw-tooth-like side surface each have a shape corresponding to a thread groove and define a cutting edge for threading. The protruding portion of the saw-tooth-like side surface has a shape extending over between the two end surfaces, and the protruding portions include two protruding portions which define a cutting edge on one end surface and two protruding portions which define a cutting edge on the other end surface. In this cutting insert, both of the end surfaces can be used as surfaces with the cutting edges for threading in this way.

This cutting insert of Patent Literature 1 is attached to a tool body via a shim plate and a cartridge and thereby a cutting edge for machining a thread groove is given to the cutting tool for threading. The cutting insert has two through holes and each through hole extends so as to be orthogonal to the two end surfaces. According to description in Patent Literature 1, this cutting insert is clamped by a clamp member which engages with these through holes.

CITATION LIST

Patent Literature

PTL 1: Japanese Patent Laid-Open No. S58-15627(1983)

SUMMARY OF INVENTION

Technical Problem

As described above, according to the description in Patent Literature 1, the cutting insert is attached to the cartridge by the clamp member which engages with the two through holes formed therein and is further fixed to the tool body. Although the same is the case with the cutting insert of Patent Literature 1, in general, such through holes are formed closer to the center of the cutting insert. Therefore, typically, a cutting condition is defined such that force to be applied to the cutting edge on one end portion of the cutting insert during cutting does not exceed a clamping capability of the cutting insert, and the stability of the cutting insert is not impaired thereby.

Conventionally, there have been needs for more heightening the cutting condition for heightening the efficiency of cutting. Since there is a tendency that cutting force is heightened by heightening the cutting condition, it is expected to further improve the clamping capability of the cutting insert in order to heighten the efficiency of cutting. This is the same also in the field of cutting tools for threading and it is demanded, in particular, in cutting of a thread groove which is large in pitch.

An object of the present invention is to heighten the clamping capability of the cutting insert for threading.

Solution to Problem

A first aspect of the present invention provides a cutting insert for threading. This cutting insert includes two opposing end surfaces, a peripheral side surface that extends between the two end surfaces and includes a first side surface portion and a second side surface portion which are arranged at different positions in a circumferential direction of the peripheral side surface, and a cutting edge which is formed at an intersecting ridgeline portion between the first end surface of the two end surfaces and the first side surface portion in the peripheral side surface, at least a portion of the cutting edge having a shape corresponding to a thread groove, wherein the second side surface portion in the peripheral side surface may have an inclined portion which enlarges outward from the first end surface side toward the second end surface side of the two end surfaces. Preferably, the inclined portion of the second side surface portion and the second end surface may define an acute first insert internal angle between them. On a plane defined so as to be orthogonal to an insert thickness direction, a second insert internal angle that is defined between the second side surface portion and the first side surface portion may be less than 180°, can be various angles and is preferably acute. More preferably, the second side surface portion is separated from the first side surface portion in the circumferential direction.

The cutting edge may have a plurality of crest portions arranged at a fixed pitch along the intersecting ridgeline portion between the first end surface and the first side surface portion, and each of the plurality of crest portions may be shaped for machining the thread groove.

When an axis is defined which extends between the two end surfaces and extends so as to pass through the peripheral side surface, the peripheral side surface can further include a third side surface portion having a substantially 180° rotational symmetric relation with the first side surface portion with respect to the axis and a fourth side surface portion having the substantially 180° rotational symmetric relation with the second side surface portion with respect to the axis. In this case, a second cutting edge having the substantially 180° rotational symmetric relation with the aforementioned cutting edge as a first cutting edge with respect to the axis can be formed at an intersecting ridgeline portion between the second end surface of the two end surfaces and the third side surface portion in the peripheral side surface. The third side surface portion may be connected to the first side surface portion or may be separated from it, in the circumferential direction. In either case, the axis can be defined so as to pass through intermediate between the first side surface portion and the third side surface portion. A first chip breaker groove is provided in the first end surface along the first cutting edge, a second chip breaker groove can be provided in the second end surface along the second cutting edge. In this case, the first side surface portion and the third side surface portion may form a third insert internal angle of less than 180° between them. Further, the crest portions of the first cutting edge, for example, at least one crest portion, preferably, all of the crest portions may be displaced from the second chip breaker groove in the circumferential direction. Likewise, the crest portions of the second cutting edge, for example, at least one crest portion, preferably, all of the crest portions may be displaced from the first chip breaker groove in the circumferential direction. Incidentally, such a cutting insert may have a substantially fan-like contour shape when viewed from a direction facing the first end surface or the second end surface.

Further, a second aspect of the present invention provides a tool body. A cutting insert to be detachably mounted to this tool body may have a cutting edge formed at an intersecting ridgeline portion between at least one of two opposing end surfaces and a peripheral side surface which extends between the two end surfaces, and an inclined portion arranged at a circumferential position different from the position of the cutting edge, and at least a portion of the cutting edge may have a shape corresponding to a thread groove. Then, preferably, the tool body has at least one insert seat, this insert seat has a bottom wall surface and a side wall surface which extends so as to rise from the bottom wall surface, the bottom wall surface and the side wall surface are configured so as to function as abutment surfaces which abut on such an cutting insert respectively, and the side wall surface may be formed so as to be engageable with the inclined portion when the cutting insert is attached to the insert seat. At least a portion of the side wall surface of the insert seat may be an inclined surface which is inclined toward the bottom wall surface. In this case, an inclination angle of the inclined surface relative to the bottom wall surface may be acute.

Further, a third aspect of the present invention provides a cutting tool for threading in which the cutting insert of the aforementioned first aspect is to be detachably attached. In this cutting tool, the cutting insert is to be detachably attached to the insert seat of the tool body. The cutting insert has an attachment hole which extends so as to pass through the two end surfaces, and the cutting insert may be fixable to the insert seat by using at least a first fixing member to be inserted into the attachment hole and a second fixing member configured to press the end surface adjacent to an operative cutting edge.

The cutting edge has a plurality of crest portions arranged at a fixed pitch, and the plurality of crest portions can include at least one finishing crest portion as a finishing edge. In this case, in the cutting insert which is fixed in the cutting tool, when a direction going from the finishing crest portion toward other crest portions is assumed to be a feeding direction of the cutting tool, the second side surface portion is located more rearward in the feeding direction than the attachment hole, and the second fixing member which is in contact with the end surface adjacent to the operative cutting edge may be located more forward in the feeding direction than the attachment hole.

In such a cutting tool, the insert seat has a bottom wall surface and a side wall surface which extends so as to rise from the bottom wall surface, the bottom wall surface and the side wall surface are configured so as to function as abutment surfaces which respectively abut on the cutting insert, and the side wall surface may be formed to be engageable with an inclined portion of the cutting insert when the cutting insert is attached to the insert seat. Incidentally, this cutting tool, that is, the tool body may be configured such that a second cutting insert for adjusting a radial dimension of the thread groove to be machined is further detachably attached thereto. The tool body can possess a second insert seat to which the second cutting insert is to be detachably attached.

BRIEF DESCRIPTION OF DRAWINGS

FIG. 13B is a diagram showing the cutting tool and a workpiece in the state in FIG. 13A from another angle.

DESCRIPTION OF EMBODIMENTS

Hereinafter, an embodiment according to the present invention will be described by reference to the drawings.

Figure 1:
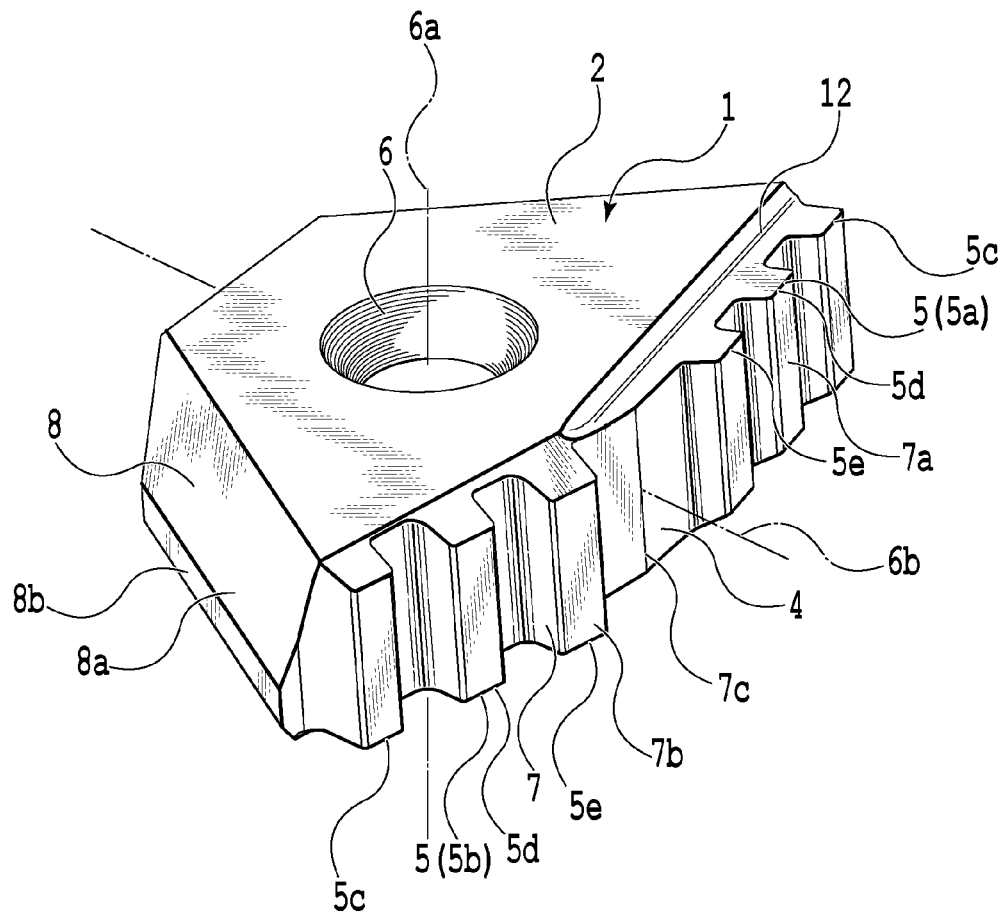
FIG. 1 is a perspective view of a cutting insert for threading, according to one embodiment of the present invention.
Figure 2:
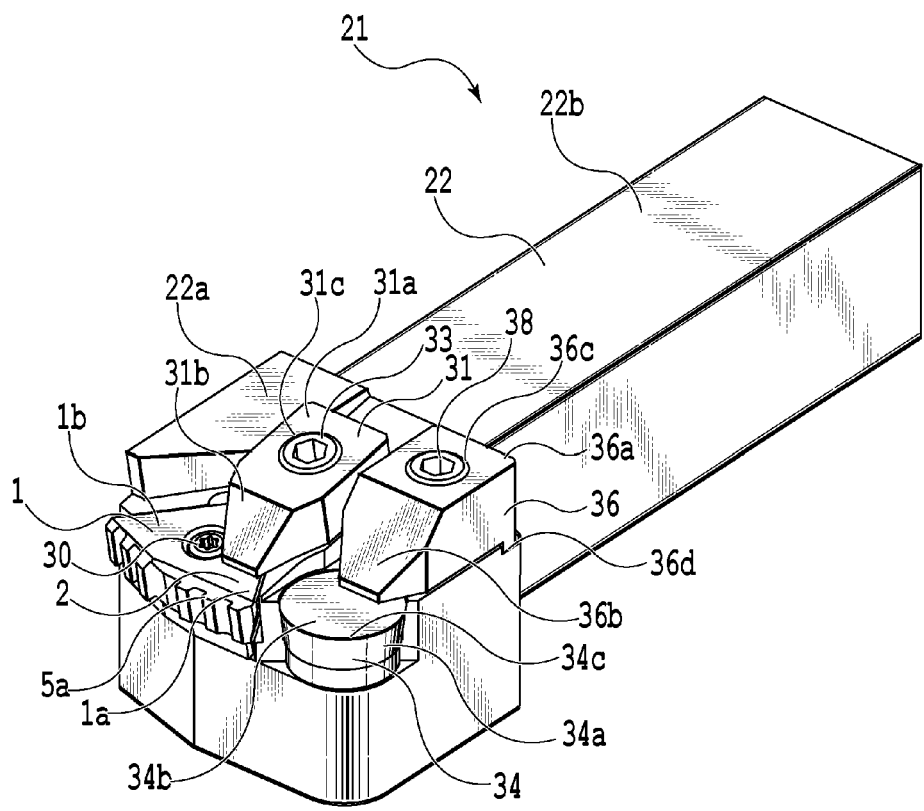
FIG. 2 is a perspective view of a cutting tool for threading according to one embodiment of the present invention, with the cutting insert in FIG. 1 having being mounted thereon.
Figure 3:
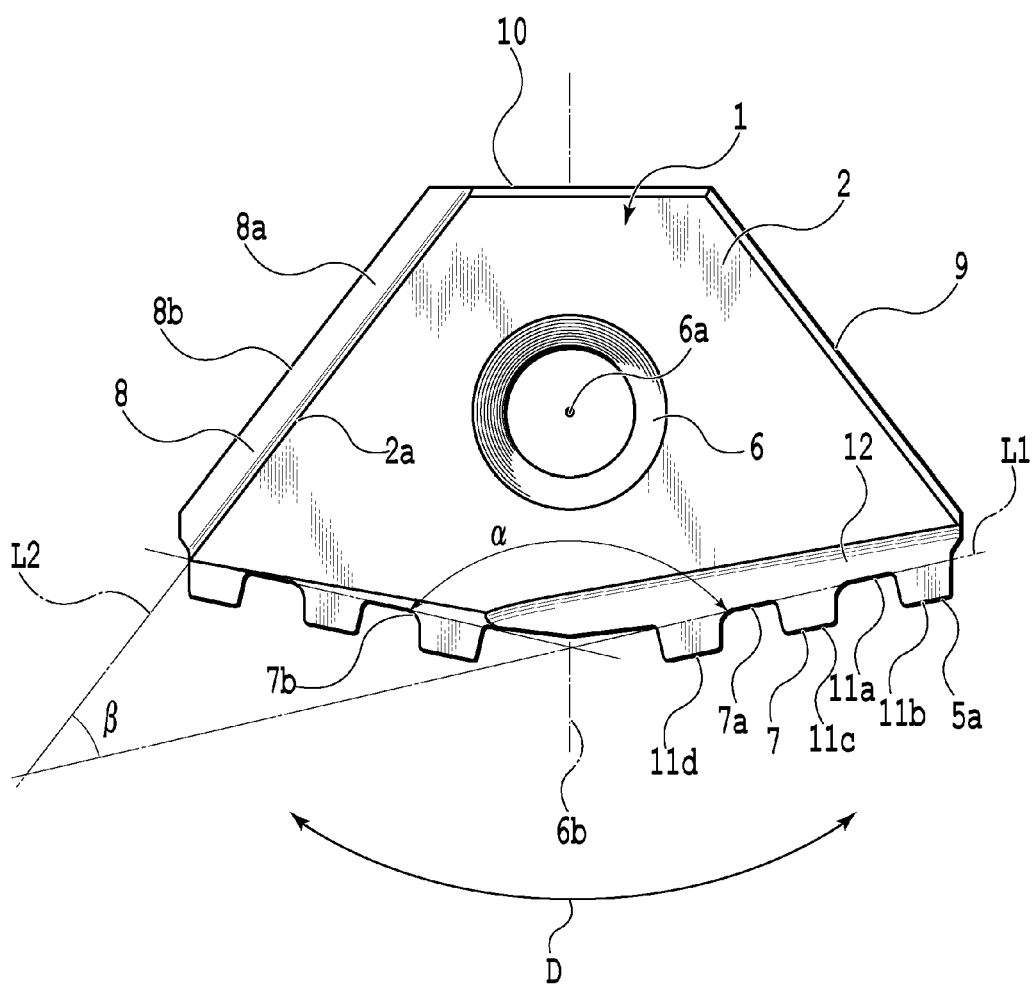
FIG. 3 is a plan view of the cutting insert in FIG. 1.
Figure 4:
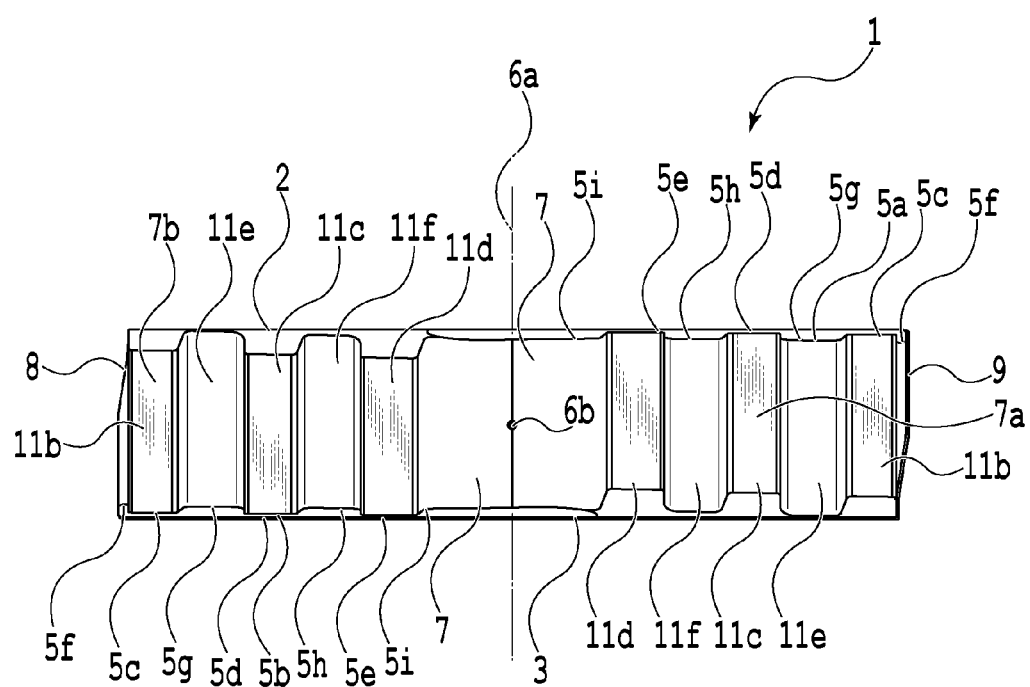
FIG. 4 is a front view of the cutting insert in FIG. 1.
Figure 5:
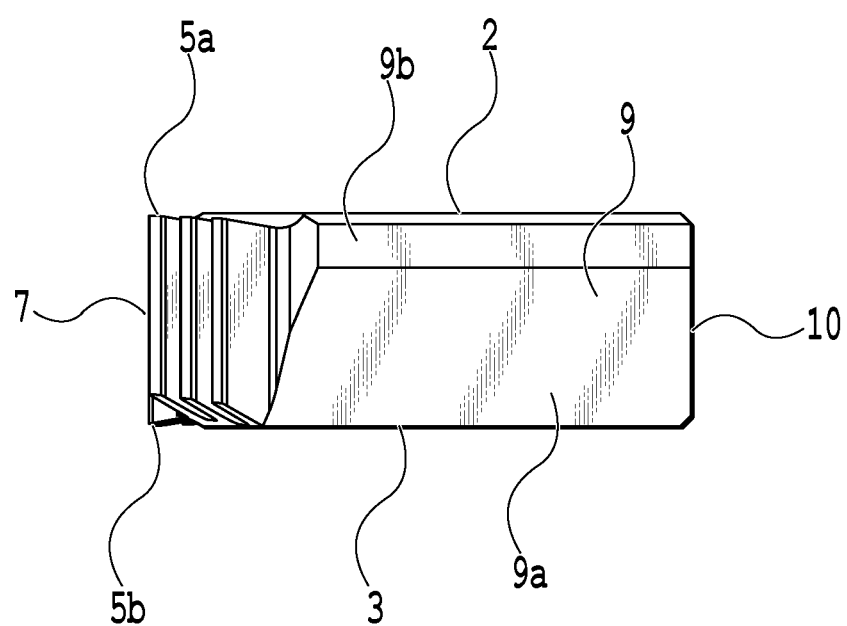
FIG. 5 is a right-side view of the cutting insert in FIG. 1.
Figure 6:
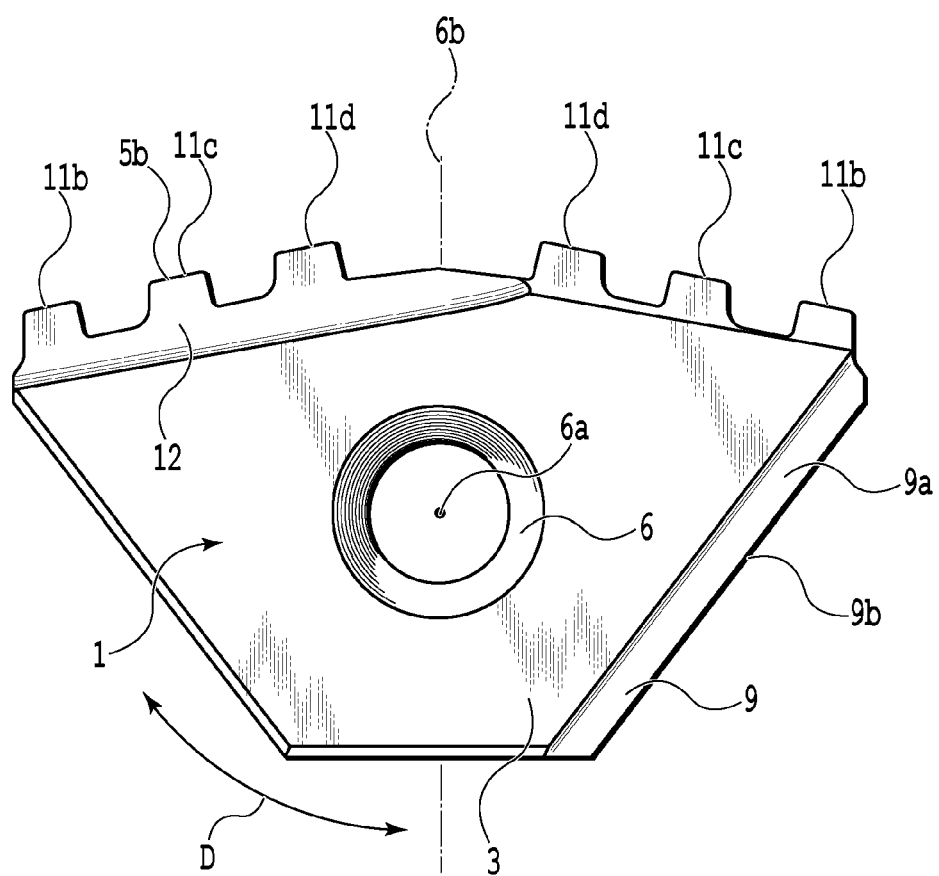
FIG. 6 is a lower surface view of the cutting insert in FIG. 1.
Figure 7:
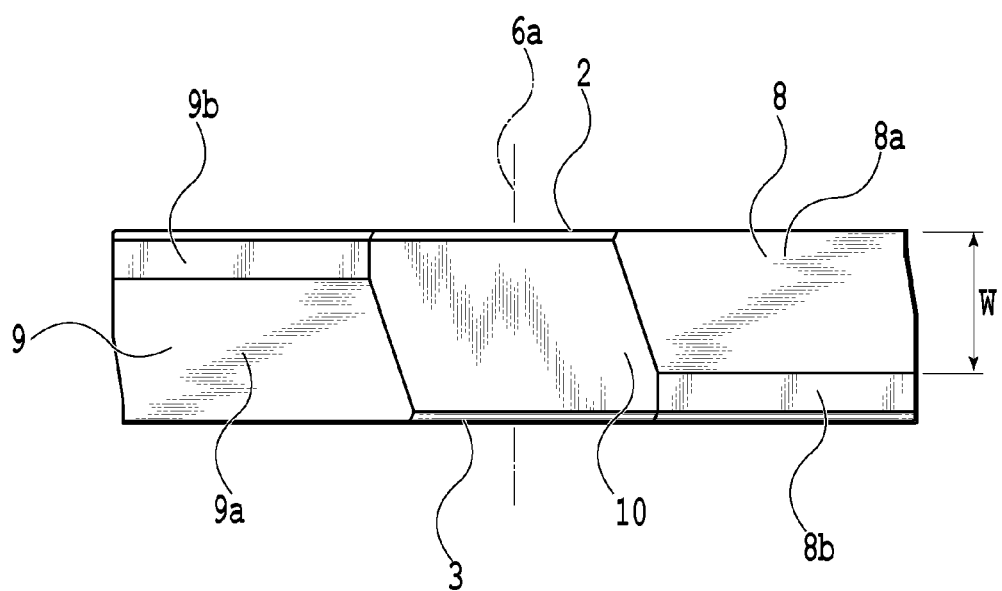
FIG. 7 is a back surface view of the cutting insert in FIG. 1.
Figure 8:
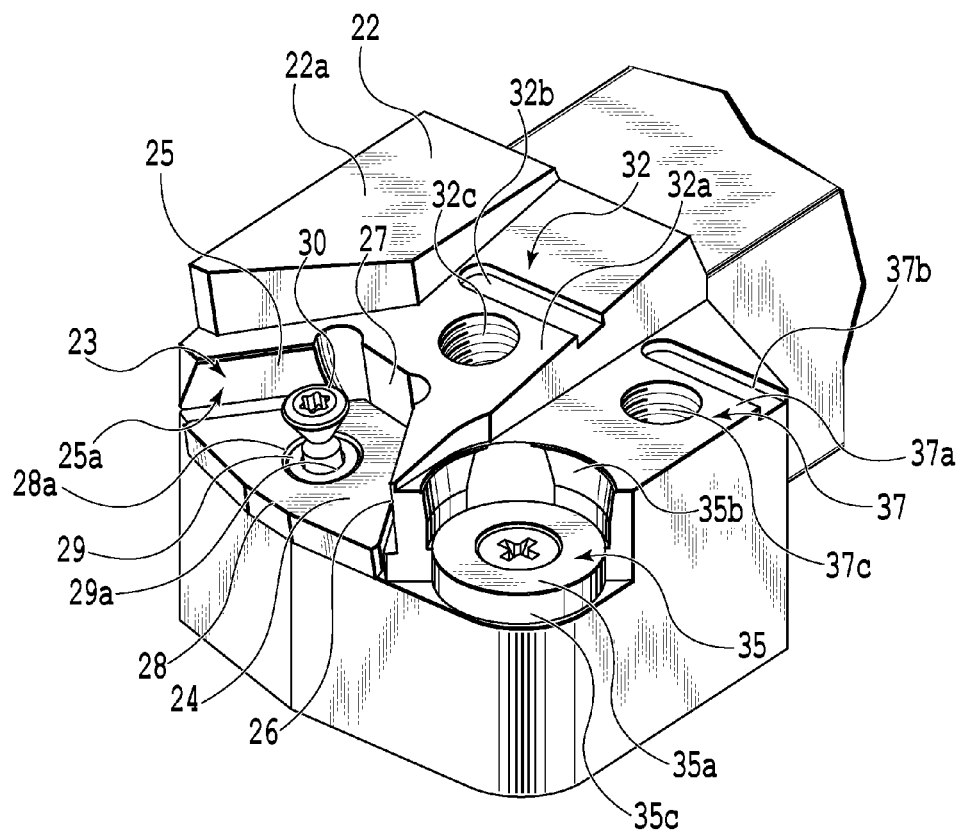
FIG. 8 is a partially enlarged diagram of a portion on the leading end side of a tool body, including insert seats thereof in a state where the cutting insert in FIG. 1 and another cutting insert have been detached from the cutting tool in FIG. 2.
Figure 9:
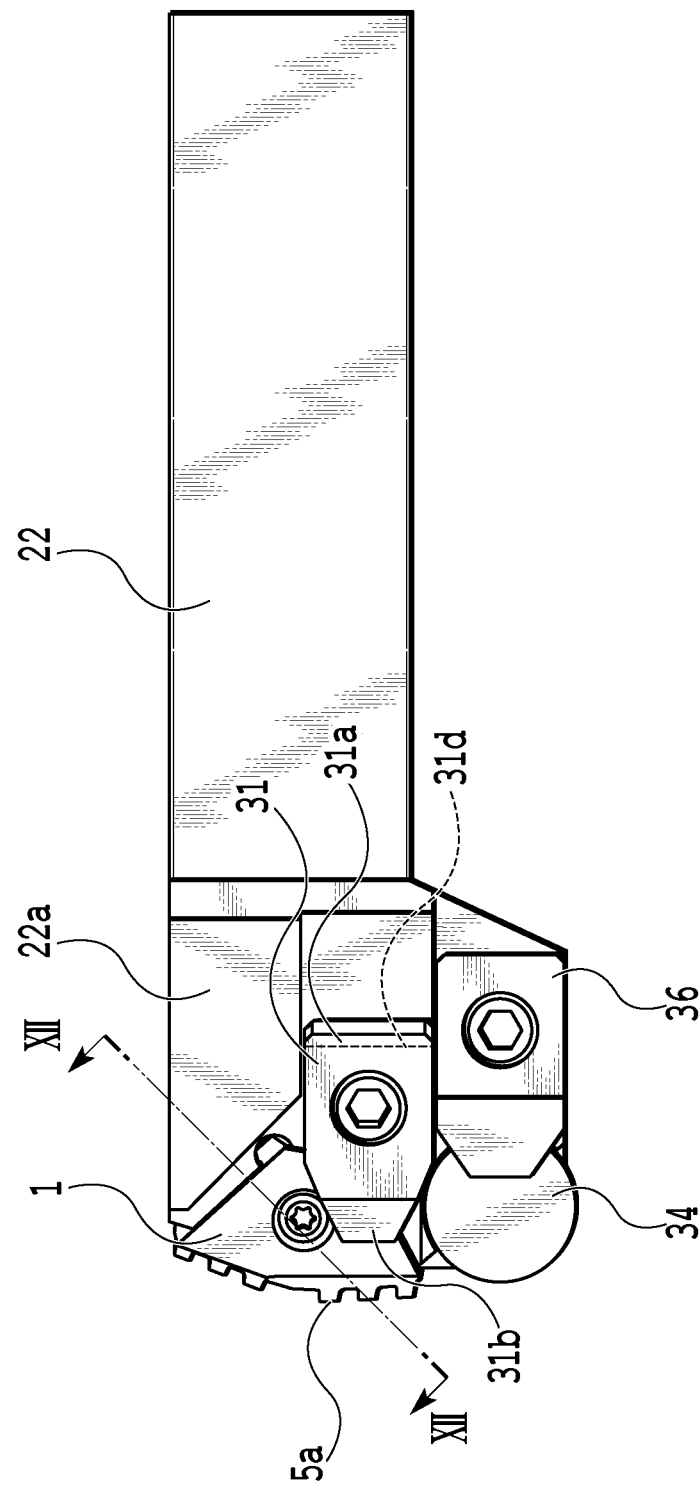
FIG. 9 is a plan view of the cutting tool in FIG. 2.
Figure 10:
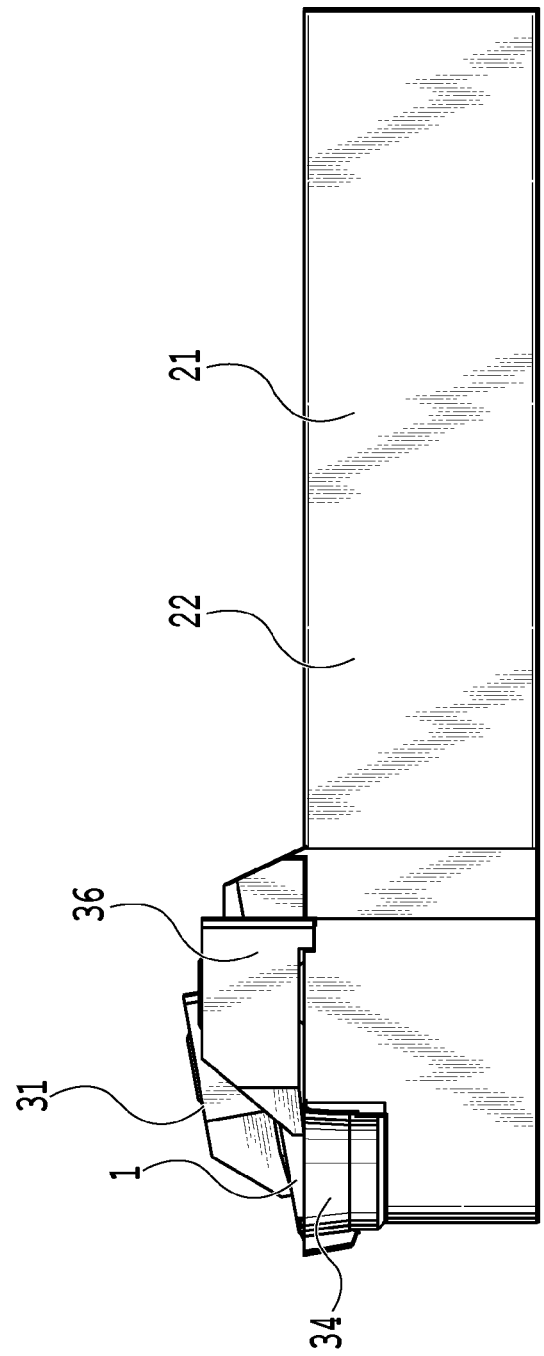
FIG. 10 is a front view of the cutting tool in FIG. 2.
Figure 11:
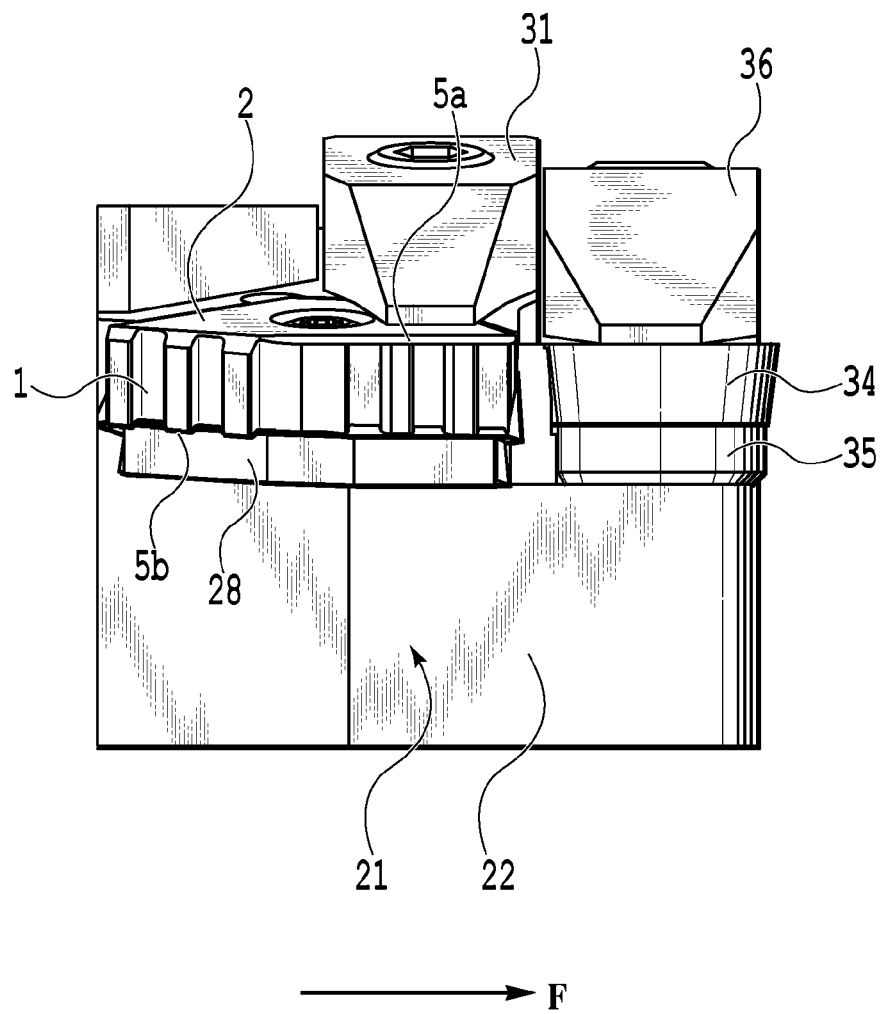
FIG. 11 is a left-side view of the cutting tool in FIG. 2.
Figure 12:
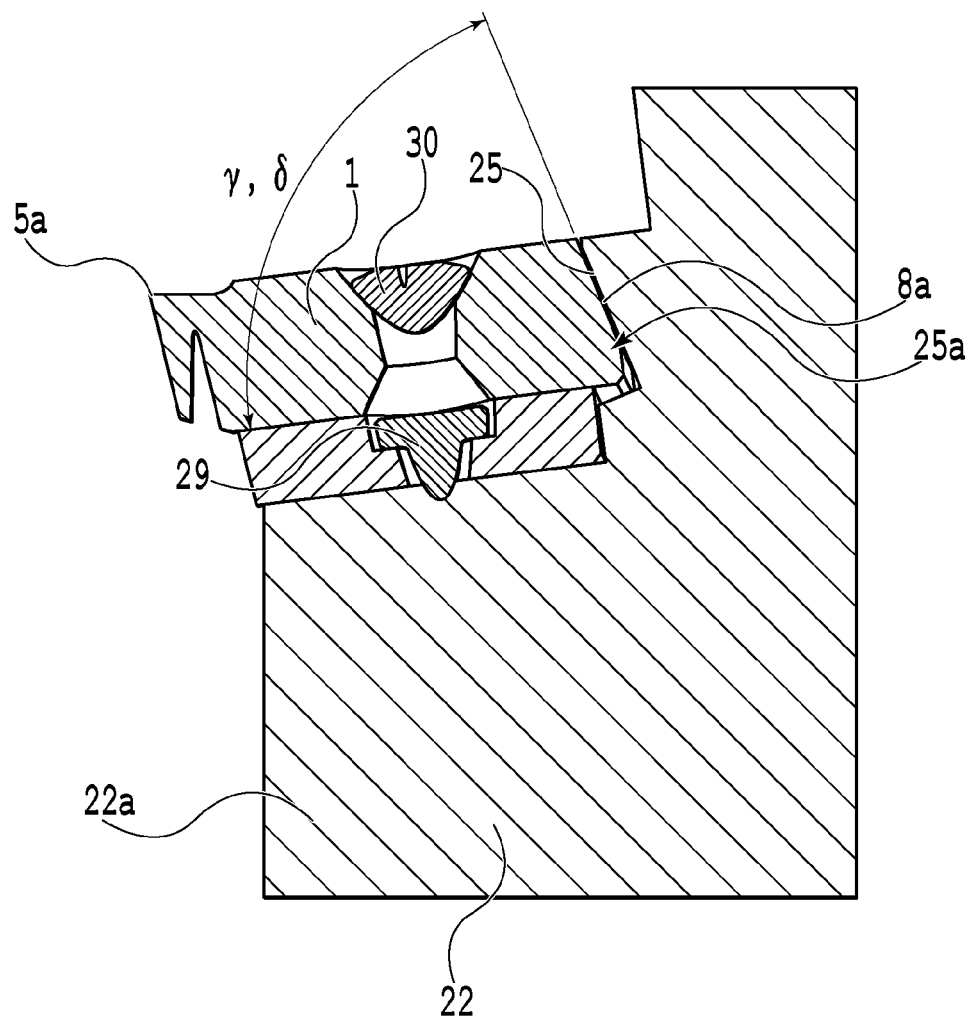
FIG. 12 is an enlarged sectional diagram along the XII-XII line in FIG. 9.
Figure 13A:
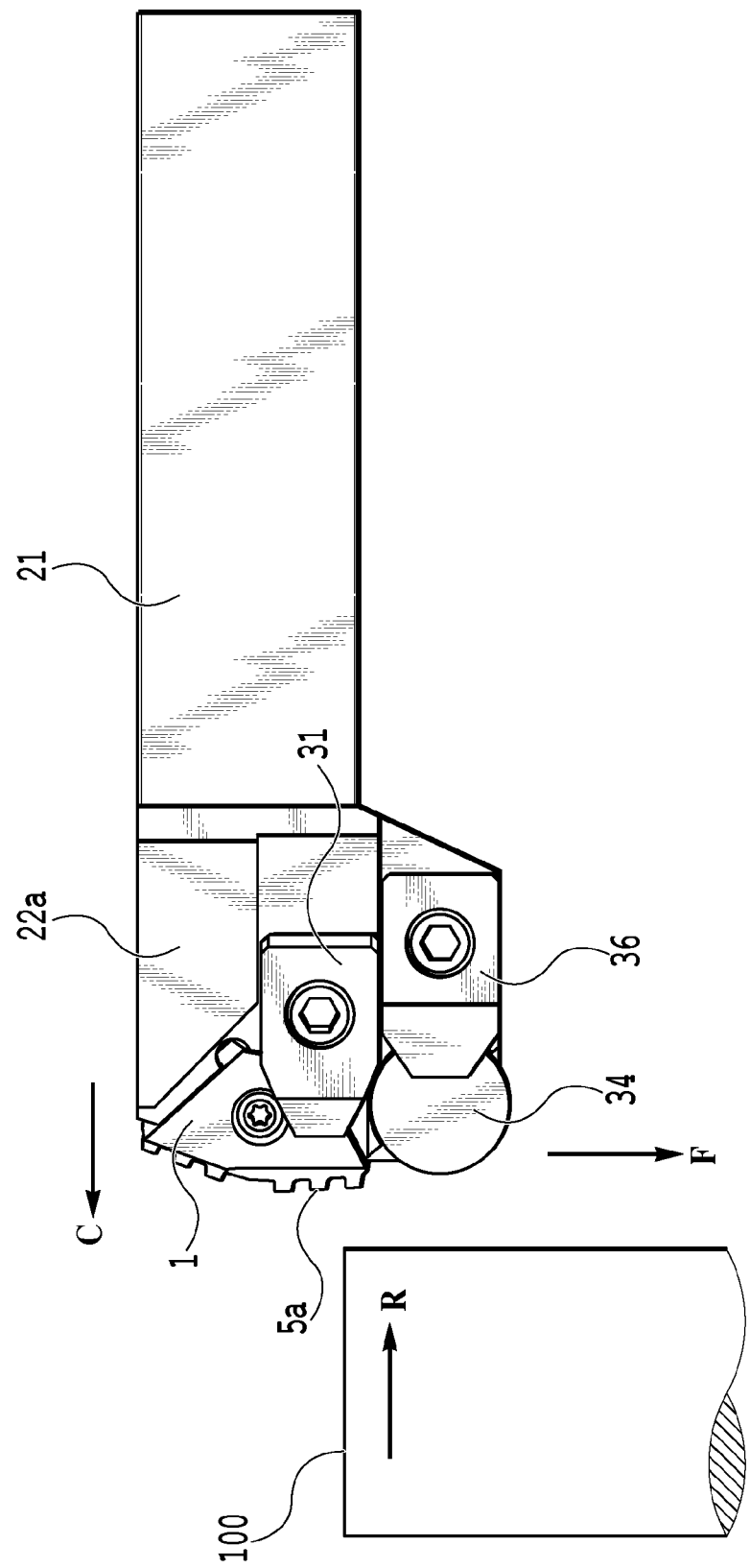
FIG. 13A is a diagram showing one example of a state of completing preparation for cutting by the cutting tool in FIG. 2.

FIG. 1 is a perspective view of a cutting insert 1 for threading according to one embodiment of the present invention. FIG. 2 is a perspective view of a cutting tool 21 for threading according to one embodiment of the present invention, with the cutting insert 1 in FIG. 1 having being mounted thereon. FIG. 3 is a plan view of the cutting insert 1 in FIG. 1. FIG. 4 is a front view of the cutting insert 1 in FIG. 1. FIG. 5 is a right-side view of the cutting insert 1 in FIG. 1. FIG. 6 is a lower surface view of the cutting insert 1 in FIG. 1. FIG. 7 is a back surface view of the cutting insert 1 in FIG. 1. FIG. 8 is a partially enlarged diagram of a portion (including a cutting part) on the leading end side of the cutting tool in FIG. 2, showing insert seats that the cutting insert 1 and so forth have been detached from the cutting tool 21 in FIG. 2. FIG. 9 is a plan view of the cutting tool in FIG. 2. FIG. 10 is a front view of the cutting tool in FIG. 2. FIG. 11 is a left-side view of the cutting tool in FIG. 2. FIG. 12 is an enlarged sectional diagram of the cutting tool 21 along the XII-XII line in FIG. 9. FIG. 13A and FIG. 13B are diagrams showing one example of a state of completing preparation for cutting by the cutting tool in FIG. 2.

First, on the basis of FIG. 1, and FIG. 3 to FIG. 7, the cutting inset 1 for thread-groove machining, that is, for threading will be described. The cutting insert 1 has two opposing end surfaces 2, 3 and a peripheral side surface 4 which extends therebetween. In this cutting insert 1, the two end surfaces 2, 3 are in a 180° rotational symmetric relation. Here, one (shown in FIG. 1) of the two end surfaces 2, 3 will be called an upper surface 2 and the other will be called a lower surface 3 expediently. The upper surface 2 and the lower surface 3 are connected together by the peripheral side surface 4. Then, a cutting edge 5 for thread-groove machining is formed at a intersecting ridgeline portion between each of the upper and lower surfaces 2, 3 and the peripheral side surface 4. Incidentally, in the following, the terms "upper", "lower" will be used in accordance with a positional relation of the upper and lower surfaces 2, 3. However, these terms are used simply for facilitating explanation and understanding and do not intend to limit the present invention.

In the cutting insert 1, an attachment hole 6 which is opened to each of the upper surface 2 and the lower surface 3 is formed. Although each of the upper surface 2 and the lower surface 3 is configured as a flat surface which extends to be substantially orthogonal to a central axis 6a of the attachment hole 6, it may have another shape. Here, as shown in FIGS. 1, 3 and 6, an axis 6b which extends so as to be orthogonal to the central axis 6a of the attachment hole 6 and to pass through the peripheral side surface 4 of the cutting insert 1 is defined. The axis 6b extends between the upper and lower surfaces 2, 3. The cutting insert 1 has a 180° rotational symmetric shape with respect to this axis 6b. Accordingly, as descried above, the upper surface 2 and the lower surface 3 (that is, two cutting edges 5 of the upper and lower surfaces 2, 3, later described) are in a mutually 180° rotational symmetric relation. Incidentally, as described later, although the cutting insert 1 has the two cutting edges, marks and so forth for mutually discriminating these cutting edges may be further assigned.

In the cutting insert 1, when viewed from a direction facing the upper surface 2 or the lower surface 3, that is, in each of FIG. 3 and FIG. 6, the contour shape of the threading insert 1 is substantially a fan-like shape. Accordingly, the peripheral side surface 4 mainly has a main side surface portion 7 which looks like a substantially arc shape in FIG. 3 and FIG. 6, two sub side surface portions 8, 9 which are connected to both sides of the main side surface portion and a back side surface portion 10 located on the opposite side of the main side surface portion 7. These side surface portions 7 to 10 are arranged in a circumferential direction D of the peripheral side surface 4 of the cutting insert 1 (around the central axis 6a). In the cutting insert 1, the aforementioned cutting edge 5 is provided in relation to the main side surface portion 7. Incidentally, the circumferential direction D indicates a direction along the circumference of the peripheral side surface 4, is schematically shown in FIG. 3 and FIG. 6 and may be defined on a plane which is defined so as to be orthogonal to an insert thickness direction (a direction parallel with the central axis 6a) which is a direction that the upper surface 2 and the lower surface 3 are connected together.

The main side surface portion 7 includes two region portions 7a, 7b. The first region portion 7a is shaped so as to form one cutting edge 5 between the first region portion 7a and the upper surface 2. The second region portion 7b is adjacent to the first region portion 7a in the circumferential direction and is shaped so as to form another cutting edge 5 between the second region portion 7b and the lower surface 3. The first region portion 7a is in the 180° rotational symmetric relation with the second region portion 7b with respect to the axis 6b. The axis 6b defined as mentioned above is defined so as to pass through the main side surface portion 7 as shown in FIG. 1 and passes through a boundary portion 7c between the first region portion 7a and the second region portion 7b. However, the axis 6b may pass through intermediate between the first region portion 7a and the second region portion 7b, and although the first region portion 7a and the second region portion 7b are continuous with each other in the cutting insert 1, they may be separated from each other.

As shown in FIG. 3 and FIG. 6, in the cutting insert 1, the first region portion 7a extends over the entire between the upper and lower surfaces 2, 3 substantially in parallel with the central axis 6a, the second region portion 7b extends over the entire between the upper and lower surfaces 2, 3 substantially in parallel with the central axis 6b. As shown in FIG. 3, the first region portion 7a extends so as to form an angle α together with the second region portion 7b. Here, the angle α will be referred to as an insert internal angle α. The insert internal angle α has an angle of less than 180°. Incidentally, the insert internal angle α is defined on a plane (not shown) which is defined so as to be orthogonal to the central axis 6a (which extends in the insert thickness direction).

Incidentally, here, the cutting edge 5 related to the upper surface 2 will be referred to as an upper cutting edge 5a and the cutting edge 5 related to the lower surface 3 will be referred to as a lower cutting edge 5b. Since these upper cutting edge 5a and lower cutting edge 5b are in the 180° rotational symmetric relation with respect to the axis 6b, in the following, first, description will be made in relation to the upper cutting edge 5a.

The first region portion 7a of the main side surface portion 7 of the peripheral side surface 4 is formed into a saw-tooth shape. The first region portion 7a has a first protruding portion 11b, a second protruding portion 11c and a third protruding portion 11d which respectively protrude from a base portion 11a (corresponding to a line L1) to be linear in FIG. 3 and are arranged at a fixed pitch in the circumferential direction. The first to third protruding portions 11b to 11d respectively protrude in parallel with a direction orthogonal to the central axis 6a and extend over the substantially entire region between the upper surface 2 and the lower surface 3 substantially in parallel with the central axis 6a (see FIG. 4). The first protruding portion 11b, the second protruding portion 11c and the third protruding portion 11d are arranged in order from the side of the sub side surface portion 9 which is adjacent to the first region portion 7a in the circumferential direction around the central axis 6a. Owing to the three protruding portions 11b to 11d, recessed portions 11e, 11f are formed between them. By having the three protruding portions 11b to 11d, the saw-tooth shaped or rack-shaped upper cutting edge 5a is formed at an intersecting ridgeline portion between the saw-tooth shaped first region portion 7a and the upper surface 2. Accordingly, the upper cutting edge 5a has three crest portions 5c, 5d, 5e. Incidentally, although here, three protrusion-shape portions of the cutting edge which have been formed on edges of the protruding portions 11b to 11d are respectively referred to as the crest portions 5c, 5d, 5e, these crest portions may be also referred to as, for example, edge protruding portions.

The crest portions of the upper cutting edge 5a each have a shape corresponding to the thread groove formed by a cutting process using this upper cutting edge 5a. A portion of the upper cutting edge 5a has the shape corresponding to the thread groove in this way.

The sizes of the three protruding portions 11a to 11c of the first region portion 7a are different from one another. By making the respective sizes of these protruding portions 11a to 11c different from one another, cutting edge portions, that is, the crest portions which are formed by the respective protruding portions are made as a finishing edge, an intermediate finishing edge which leaves a cutting allowance relative to the finishing edge, and a roughing edge which further leaves a cutting allowance relative to the intermediate finishing edge. These individual cutting edge portions sequentially act on the work piece and thereby the thread groove is cutting-machined. That is, first, the roughing edge performs cutting, then the intermediate finishing edge and the finishing edge are sequentially perform cutting and thereby cutting which is high in machining efficiency can be made. That is, since cutting to be done three times can be done at one try, the machining efficiency can be improved three or more times. Incidentally, the crest portion 5c of the upper cutting edge 5a formed by the first protruding portion 11b on the side of the sub side surface portion 9 is made as the roughing edge, the crest portion 5d of the upper cutting edge 5a formed by the second protruding portion 11c is made as the intermediate finishing edge, the crest portion 5e of the upper cutting edge 5a formed by the third protruding portion 11d is made as the finishing edge. Here, the crest portion 5e can be referred to as a finishing crest portion.

Incidentally, also trough portions 5f, 5g, 5h, 5i which extend substantially along the base portion 11a of the first region portion 7a are included in the upper cutting edge 5a. However, the trough portions 5f, 5g, 5h, 5i may not act as the upper cutting edge 5a by being alienated from the workpiece during cutting. Incidentally, also the portions 5f, 5i on the both sides of the upper cutting edge 5a are referred to as the "trough portions" here.

Incidentally, the number of the crest portions in the upper cutting edge 5a, that is, the number of the protruding portions of the first region portion 7a is not limited to three. The number of crest portions of one cutting edge 5 may be one, two, and may be more than three. That is, the number of the protruding portions in one region portion of the main side surface portion is not limited to three, may be one, two and may be more than three. It is appropriately adjusted in accordance with the necessary machining efficiency. A series of intersecting ridgeline portions or edge portions including one or the plurality of crest portion(s) and the trough portion(s) between them and portions (the trough portions) on the both sides of the cutting edge will be called the cutting edge 5, here. However, for example, portions on the both sides of the cutting edge may not be included in the cutting edge and the entire of the cutting edge may have a shape corresponding to the thread groove.

As for the upper cutting edge 5a, the first region portion 7a of the main side surface portion 7 functions as a flank and a portion of the upper surface 2 which is a related (adjacent) end surface functions as a rake surface. In association therewith, a chip breaker groove 12 is provided in the upper surface 2 which leads to the upper cutting edge 5a. The chip breaker groove 12 extends along the upper cutting edge 5a as shown in FIG. 3.

Also, the lower cutting edge 5b is configured similarly to the upper cutting edge 5a configured as mentioned above. In FIGS. 1, 3 to FIG. 7, also as for the lower cutting edge 5b, numerals used in the description of the upper cutting edge 5a are similarly assigned to the components thereof and related components, and further description thereof is omitted.

The cutting inset 1 can sequentially use the two cutting edges 5a, 5b on both of the upper surface 2 and the lower surface 3 in this way. That is, one cutting insert 1 can be used at least two times. When using the upper cutting edge 5a as the operative cutting edge, the lower surface 3 acts as a seating surface and abuts on the bottom wall surface of the insert seat of the cutting tool such that the cutting insert 1 is mounted to the tool body of the cutting tool 21. When using the lower cutting edge 5b as the operative cutting edge, the upper surface 2 is made as the seating surface. Incidentally, the cutting insert 1 is designed into the 180° rotational symmetric shape such that when the upper and lower surfaces have been inverted, the positions of the cutting edges are made the same as each other. However, the cutting insert according to the present invention may have asymmetry within a scope which would cause no trouble in use. For example, the cutting insert of the present invention may have the substantially 180° rotational symmetric shape with respect to the axis 6b.

As described above, the cutting edges 5 (5a, 5b) is formed in relation to the main side surface portion 7 of the peripheral side surface 4. The sub side surface portions 8, 9 on the both sides of this main side surface portion 7 are configured so as to serve as abutment engagement surfaces to the insert seat of the later described tool body. First, description will be made in relation to the sub side surface portion 8.

The sub side surface portion 8 includes an inclined portion 8a and a plane portion 8b which are two surface portions. The inclined portion 8a enlarges outward from the upper surface 2 toward the lower surface 3 side, and, in other words, is inclined relative to the central axis 6a. The plane portion 8b linearly extends in FIG. 3 and extends in substantially parallel with the central axis 6a of the attachment hole 6. The inclined portion 8a and the plane portion 8b are made continuous in order from the upper surface 2 toward the lower surface 3 in a direction parallel with the central axis 6a, and extend across the entire between the side surface portions 7, 10 on the both sides thereof respectively. The plane portion 8b is connected to the lower surface 3, and the inclined portion 8a is connected to the upper surface 2. When the cutting insert 1 has been viewed from the side facing the upper surface 2, that is, in FIG. 3, the sub side surface portion 8 extends so as to form an angle $\beta$ together with the first region portion 7a of the main side surface portion 7. Here, the angle $\beta$ is referred to as an insert internal angle $\beta$ and is acute. In FIG. 3, a straight line L1 along the base portion 11a of the first region portion 7a and a straight line L2 along the intersecting ridgeline portion between the inclined portion 8a and the upper surface 2 are shown, and the insert internal angle $\beta$ is shown between them. The insert internal angle $\beta$ is defined on the plane which is defined so as to be orthogonal to the central axis 6a in this way.

In the cutting insert 1, the inclined portion 8a is a plane surface. The inclined portion 8a is formed such that a width W (FIG. 7) of the inclined portion 8a in a direction parallel with the central axis 6a is the same or is not changed at an end portion of the side of a main side surface portion 7 and an end portion of the side of a back side surface portion 10. Then, the inclined portion 8a extends so as to form an angle $\gamma$ together with the lower surface 3 which is another end surface which is different from the adjacent end surface. The angle $\gamma$ is acute. Here, the angle $\gamma$ is referred to as an insert internal angle $\gamma$. The insert internal angle $\gamma$ may be defined on a plane which is defined so as to be orthogonal to an intersecting ridgeline portion 2a between the inclined portion 8a and the upper surface 2 in FIG. 3. The insert internal angle $\gamma$ is shown in FIG. 12. Incidentally, the width W of the inclined portion 8a and the angle $\gamma$ of the inclined portion 8a relative to the lower surface 3 may be set so as to appropriately achieve engagement with the wall surface of the insert seat of the later described tool body. In addition, it is not necessary for the inclined portion 8a to be a plane and it may be configured as, for example, an inclined curved surface.

Also the sub side surface portion 9 includes an inclined portion 9a and a plane portion 9b. The inclined portion 9a and the plane portion 9b of the sub side surface portion 9 respectively correspond to the inclined portion 8a and the plane portion 8b of the sub side surface portion 8. The sub side surface portion 9 and the sub side surface portion 8 are in the 180° rotational symmetric relation with respect to the axis 6b, here, are configured in a mutually similar manner and therefore further description of the sub side surface portion 9 is omitted, here.

These sub side surface portions 8, 9 each may be configured only by the inclined portion. In addition, the inclined portion of each of the sub side surface portions 8, 9 may not extend across the entire between the main side surface portion and the back side surface portion as in the cutting insert 1 and may extend along only portion between them. In addition, each of the sub side surface portions 8, 9 may be curved in the circumferential direction D. In this case, when defining the insert internal angle β, each of the sub side surface portions 8, 9 may be regarded as a plane which connects one end portion thereof with the other end portion thereof in the circumferential direction D. Further, the inclined portion of the sub side surface portion may not be directly connected to either of the upper and lower surfaces. For example, the inclined portion 8a of the sub side surface portion 8 extends apart from the upper surface 2 and can be formed so as to enlarge outward from the side of the upper surface 2 toward the side of the lower surface 3. In addition, the inclined portion 8a of the sub side surface portion 8 may be directly connected to the lower surface 3. These are the same also in the sub side surface portion 9.

The back side surface portion 10 is configured as a plane and extends substantially in parallel with the central axis 6a. However, also the back side surface portion 10 may have a surface portion which is inclined so as to form an acute internal angle relative to one of the upper and lower surfaces similarly to the inclined portion 8a of the sub side surface portion 8 and the inclined portion 9a of the sub side surface portion 9. In this case, the number of the inclined surface portions of the back side surface portion 10 may be equal to the number of the cutting edges in the cutting insert.

Incidentally, in the cutting insert 1, although the upper cutting edge 5a corresponds to a first cutting edge of the present invention and the lower cutting edge 5b corresponds to a second cutting edge of the present invention, a relation between them may be reversed. In a case where the upper cutting edge 5a corresponds to the first cutting edge and the lower cutting edge 5b corresponds to the second cutting edge, the first region portion 7a corresponds to a first side surface portion of the present invention, and the second region portion 7b corresponds to a third side surface portion of the present invention. In addition, in this case, the sub side surface portion 8 corresponds to a second side surface portion of the present invention, and the sub side surface portion 9 corresponds to a fourth side surface portion of the present invention.

The cutting tool 21 for threading to which the cutting insert 1 having the above-mentioned configuration is to be detachably mounted will be described on the basis of FIG. 2, and FIG. 8 to FIG. 13B. The cutting tool 21 is a threading tool which is a cutting tool for lathe.

First, on the basis of FIG. 2 and FIG. 8, a tool body 22 of the cutting tool 21 will be described. The tool body 22 is a holder and includes a cutting part 22a and a shank part 22b. The cutting part 22a and the shank part 22b are continuously arranged in succession in a longitudinal direction of the tool body 22, the cutting part 22a is located on the leading end side and the shank part 22b is located on the rear end side.

The cutting part 22a is provided with a (first) insert seat 23 to which the above-mentioned cutting insert 1 is to be attached. The insert seat 23 has a bottom wall surface 24, and three side wall surfaces 25, 26, 27 which extend so as to rise from the bottom wall surface 24. The three side wall surfaces 25, 26, 27 include the first side wall surface 25 located on the rear side in a feeding direction F of the cutting tool 21, the second side wall surface 26 located on the front side in the feeding direction F, and the third side wall surface 27 which extends between the first side wall surface 25 and the second side wall surface 26. Incidentally, the feeding direction F is shown in FIG. 13A.

As shown in FIG. 8, a shim plate 28 is fixed with a screw 29 and thereby the bottom wall surface 24 of the insert seat 23 is formed on the shim plate 28. The screw 29 is screwed into a not shown screw hole via a through hole 28a in the shim plate 28.

In addition, in FIG. 8, a screw 30 which is a first fixing member is screwed into a female screw hole 29a which is formed along an axis of the screw 29. The screw 30 is screwed into the female screw hole 29a in the screw 29 via the attachment hole 6 in the cutting insert 1 and thereby the cutting insert 1 is attached to the insert seat 23, as can be understood from FIG. 2 and FIG. 8.

For easy understanding, in the following, as for a case where the upper cutting edge 5a is made as the operative cutting edge, the insert seat 23 will be described. Here, the operative cutting edge indicates a cutting edge which has been brought into an available state and is a cutting edge which can act on the workpiece.

In a case of attaching the cutting insert 1 so as to make the upper cutting edge 5a as the operative cutting edge, the sub side surface portion 8 is brought into abutment on the first side wall surface 25. In particular, the first side wall surface 25 is an inclined surface which is inclined toward the bottom wall surface 24 so as to abut on the inclined portion 8a of the sub side surface portion 8. Incidentally, although, here, almost the entire of the first side wall surface 25 is one inclined surface, only portion of the first side wall surface 25 may be an inclined surface to abut on the inclined portion 8a of the sub side surface portion 8. An inclination angle of the first side wall surface 25 is substantially the same or the same as an inclination angle of the inclined portion 8b of the sub side surface portion 8 relative to the lower surface 3 and corresponds to the insert internal angle γ. This first side wall surface 25 defines an inwardly-dented recessed portion 25a which is substantially triangular in section, together with the bottom wall surface 24. An inclination angle δ (a intersecting angle between the first side wall surface 25 and the bottom wall surface 24) of the first side wall surface 25 relative to the bottom wall surface 24 is shown in FIG. 12, is acute, is an angle between, for example, 70° to 85° and is about 80° in the present embodiment. Incidentally, the inclination angle δ of the first side wall surface 25 relative to the bottom wall surface 24 may be made slightly smaller than the insert internal angle γ. This is because the inclined portion 8a of the sub side surface portion 8 of the cutting insert 1 more favorably abuts on an upper portion (a portion which is more remote from the bottom wall surface) of the first side wall surface 25 in order to make the inclined portion 8a engageable with the first side wall surface 25 more firmly. However, this does not exclude that the inclination angle δ of the first side wall surface 25 relative to the bottom wall surface 24 is slightly larger than the insert internal angle γ.

In a case of attaching the cutting insert 1 so as to make the upper cutting edge 5a as the operative cutting edge, the sub side surface portion 9 is made abuttable on the second side wall surface 26. In particular, the second side wall surface 26 extends so as to form a substantially right angle relative to the bottom wall surface 24 so as to be able to abut on the plane portion 9b of the sub side surface portion 9. Incidentally, the sub side surface portion 9 may not abut on the second side wall surface 26.

In addition, in the case of attaching the cutting insert 1 so as to make the upper cutting edge 5a as the operative cutting edge, the back side surface portion 10 is brought into abutment on the third side wall surface 27. The third side wall surface 27 extends so as to form a substantially right angle relative to the bottom wall surface 24. Incidentally, although the back side surface portion 10 may not abut on the third side wall surface 27, preferably the back side surface portion 10 abuts on the third side wall surface 27.

Further, a (first) pressing member 31 is used in order to fix the cutting insert 1 to the insert seat 23. The pressing member 31 is a second fixing member and is configured so as to press and fix the cutting insert 1 to the insert seat 23.

The pressing member 31 is attached to an attachment seat 32 of the cutting part 22a of the tool body 22. The attachment seat 32 has a substantially flat attachment surface 32a. In the attachment surface 32a, a slot 32b and a screw hole 32c are formed. The slot 32b is located closer to the side of the shank part 22b than the screw hole 32c. The slot 32b has a shape which is opened toward the front side of the feeding direction F and is closed toward the rear side of the feeding direction F.

The pressing member 31 includes a fixing portion 31a to be positioned on the attachment seat 32 and a pressing portion 31b configured to press the cutting insert 1 by extending from the fixing portion 31a. The fixing portion 31a is provided with a through hole 31c into which a screw 33 to be screwed into the screw hole 32c is to be inserted and an elongated projecting portion 31d which projects toward the lower side of the fixing portion 31a. The through hole 31c is located closer to the pressing portion 31b than the projecting portion 32d. The projecting portion 31d is shaped to be able to be fitted into the slot 32b in the attachment seat 32 of the tool body 22.

The pressing member 31 is arranged on the attachment seat 32 in a state where the projecting portion 31d is left fitted into the slot 32b in the attachment seat 32 and is firmly fixed by screwing the screw 33 into a screw hole 32c via the through hole 31c. The pressing member 31 and the attachment seat 32 are formed such that the pressing portion 31b of the pressing member 31 firmly presses the cutting insert 1 which has been attached to the insert seat 23 by fixing of this pressing member 31. However, the insert seat 23 is at a position where it has been depressed more downward than the attachment seat 32 (see FIG. 8 and so forth) so as to enable the pressing member 31 to press the cutting insert 1 down from the upper side thereof. Incidentally, since the cutting insert 1 is attached to the insert seat 23 by inclining downward toward the longitudinal leading end side of the cutting tool so as to give a predetermined positive clearance angle (see FIG. 10), also the pressing member 31 is attached with an inclination similarly. The insert seat 23 and the attachment seat 32 are designed so as to attain such inclination.

Further, a second insert seat 35 for arranging a second cutting insert 34 is positioned on the more forward side than the insert seat 23 relative to the feeding direction F of the cutting tool 21. The second cutting insert 34 is adapted to perform rough machining so as to match a sectional diameter of the workpiece with a screw diameter, here.

The second cutting insert 34 has a substantially disk-shaped contour. The second cutting insert 34 includes two opposing end surfaces each of which is substantially circular and a peripheral side surface 34a which extends between these two end surfaces. In FIG. 2, of the two opposing end surfaces, one end surface 34b is shown. An intersecting ridgeline portion between the end surface 34b and the peripheral side surface 34a forms a cutting edge 34c.

The second insert seat 35 is configured to open toward the longitudinal leading end side of the tool body 22 and the front side in the feeding direction F and includes a bottom wall surface 35a and a semi-cylindrical side wall surface 35b. Incidentally, although the bottom wall surface 35a is formed by a shim plate 35c, the shim plate 35c may be omitted.

Further, a second pressing member 36 configured so as to press and fix the second cutting insert 34 arranged on the second insert seat 35 is used. The second pressing member 36 is attached to a second attachment seat 37 of the cutting part 22a of the tool body 22. The second attachment seat 37 includes a substantially flat attachment surface 37a, a slot 37b positioned in the attachment surface 37a, and a screw hole 37c positioned in the attachment surface 37a. The slot 37b is located closer to the side of the shank part 22b than the screw hole 37c. The slot 37b has a shape which is opened toward the front side of the feeding direction F and is closed toward the rear side of the feeding direction F. The second attachment seat 37 has substantially the same configuration as the above-mentioned attachment seat 32 in this way.

The second pressing member 36 includes a fixing portion 36a to be positioned on the second attachment seat 37 and a pressing portion 36b configured to press the second cutting insert 34 by extending from the fixing portion 36a. The fixing portion 36a is provided with a through hole 36c into which a screw 38 to be screwed into the screw hole 37c is to be inserted and an elongated projecting portion 36d which projects toward the lower side of the fixing portion 36a. The through hole 36c is located closer to the pressing portion 36b than the projecting portion 36d. The projecting portion 36d is shaped to be able to be fitted into the slot 37b in the second attachment seat 37 of the tool body 22.

The second pressing member 36 is arranged on the second attachment seat 37 in a state where the projecting portion 36d is left fitted into the slot 37b in the second attachment seat 37 and is firmly fixed by screwing the screw 38 into a screw hole 37c via the through hole 36c. The pressing portion 36b of the second pressing member 36 can press and fix the second cutting insert 34 to the second insert seat 34 by fixing of this second pressing member 36.

In the following, the operation and effects of the cutting tool 21 that the above-mentioned cutting insert 1 has been fixed to the tool body 22 will be described. Incidentally, also the above-mentioned second cutting insert 34 is fixed to this cutting tool 21.

In FIG. 13A and FIG. 13B, the moment that a thread groove is just about to be machined in a workpiece 100 which is a round bar by the cutting tool 21 is schematically shown. The cutting tool 21 is fixed to a bite holder (not shown) of a lathe so as to make the upper cutting edge 5a as the operative cutting edge. At this time, in FIG. 13A, the base portion 11a of the first region portion 7a is made substantially parallel, preferably parallel with the feeding direction F. Incidentally, the lower cutting edge 5b which is a cutting edge (an inoperative cutting edge) which is not the operative cutting edge is positioned on the rear side in the feeding direction F relative to the upper cutting edge 5a. The workpiece 100 is fixed to a chuck of the lathe and is rotated in a rotational direction R around an axis O. The cutting tool 21 is positioned having a predetermined cutting amount in a predetermined cutting direction C relative to this workpiece. Thereafter, the cutting tool 21 is moved in the feeding direction F at a predetermined velocity. Thereby, the thread groove can be machined and formed on an outer peripheral surface of the workpiece 100.

Then, when machining this workpiece, the cutting insert 1 is securely and firmly fixed to the insert seat 23. The cutting insert 1 is fixed with the screw 30 which is the first fixing member. In addition, the inclined portion 8a of the sub side surface portion 8 which is present on the more rear side of the feeding direction F than the upper cutting edge 5a abuts on and engages with the first side wall surface 25 of the insert seat 23. Accordingly, even in a case where large force is exerted onto the upper cutting edge 5a which is the operative cutting edge and a portion (a portion of the side of the sub side surface portion 8) on the opposite side of the upper cutting edge 5a with the screw 30 interposed tends to float, such floating of the cutting insert 1 is prevented by engagement of the inclined portion 8a with the first side wall surface 25. Accordingly, since the cutting insert is firmly held (that is, clamped) to the insert seat, the possibility that a defect such as a fracture and so forth may occur in the cutting edge is surely reduced. Incidentally, a complementary engagement structure of the inclined portion 8a with the first side wall surface 25 is designed so as to prevent such floating and to press the cutting insert 1 in a direction of the bottom wall surface 24 of the insert seat 23 and is allowed to be various shapes and structures.

Owing to making the contour shape of the cutting insert 1 substantially fan-like, as described above, in planar views (end surface views) in FIG. 3 and FIG. 6, the sub side surface portion 8 is formed in an direction (the line L2 direction) inclined relative to the feeding direction F of the cutting tool 21, that is, a pitch direction (a direction parallel with the line L1) of the cutting edge 5 having a shape corresponding to the thread groove. When the sub side surface portion 8 is formed in the direction inclined relative to the feeding direction F of the cutting tool 21 in this way, when force is applied to the upper cutting edge 5a by cutting, the sub side surface portion 8 can cope with forces in two directions. That is, one sub side surface portion 8 can act to press the cutting insert 1 against both forces of the force that the upper cutting edge 5a is lowered and the side of the back side surface portion 10 on the opposite side of the upper cutting edge 5a intends to float and the force that the upper cutting edge 5a is inclined and the side of the second region portion 7b on the opposite side of the upper cutting edge 5a is inclined and intends to float.

In addition, the sub side surface portion 8 (or 9) having the inclined portion is formed in a region which is different in the circumferential direction from the region portion 7a (or 7b) of the related main side surface portion, in particular, in a remote region. In addition, in the cutting insert 1, the attachment hole is substantially located between the sub side surface portion and the related region portion of the main side surface portion 7 in relation to one cutting edge.

Accordingly, floating of the cutting insert can be more appropriately prevented by engagement of the sub side surface portion.

Further, the cutting insert 1 is pressed against the insert seat 23 by the pressing member 31 which is the second fixing member. The pressing member 31 is located on the opposite side of a place of engagement of the inclined portion 8a with the first side wall surface 25 with the screw 30 in the attachment hole 6 being interposed. As described above, although floating of a rear portion (a rear part 1b) in the feeding direction of the cutting insert 1 can be prevented by engagement of the inclined portion 8b with the first side wall surface 25, the possibility that a front-side portion (a front part 1a) in the feeding direction of the cutting insert 1 may float still remains. Here, since the pressing force by the pressing member 31 acts on the front part 1a of the cutting insert 1, also floating of the front part 1a of the cutting insert 1 can be more appropriately prevented. Incidentally, the pressing member 31 is allowed to be a member such as a so-called pressing piece and so forth.

As in the cutting tool 21 in FIG. 13A, the sub side surface portion 8 which is not adjacent to the operative cutting edge 5a may be arranged more rearward of the feeding direction than the attachment hole 6 in the cutting insert 1. On the contrary, the pressing member 31 such as the pressing piece and so forth which abuts on the end surface 2 which is different from the seating surface of the cutting insert may be arranged more forward of the feeding direction than the attachment hole 6 in the cutting insert. Then, the screw 30 as the first fixing member for attaching the cutting insert 1 is arranged near the operative cutting edge 5a in the feeding direction, the sub side surface portion 8 configured to suppress floating of the cutting insert 1 may be arranged on the rear side of the feeding direction, preferably, more remotely from the operative cutting edge 5a. When so arranged, in a case where there is the possibility that the cutting insert 1 may float, the cutting insert can be most effectively pressed by engagement of the inclined portion of the sub side surface portion. Therefore, the clamping capability of the cutting insert is increased and the defect such as the fracture and so forth of the cutting edge can be prevented or suppressed most effectively.

In addition, in the cutting insert 1, the chip breaker groove 12 is formed in the related end surface along the cutting edge 5. In contrast, since the chip breaker groove does not extend on a portion of the end surface which is located directly under the operative cutting edge, it is possible to accept the force acting on the operative cutting edge more firmly by abutment of the end surface of the cutting insert on the bottom wall surface of the insert seat. Specifically, when the upper cutting edge 5a is used as the operative cutting edge, the chip breaker groove 12 related to the lower cutting edge 5b which is the inoperative cutting edge extends on the lower surface 3 serving as the seating surface. As apparent from FIG. 3 and FIG. 6, this chip breaker groove 12 of the lower cutting edge 5b does not overlap the three protruding portions which form the crest portions of the upper cutting edge 5a in the circumferential direction D of the cutting insert. That is, this chip breaker groove 12 of the lower cutting edge 5b is displaced in the circumferential direction D from all of the crest portions of the upper cutting edge 5a. Accordingly, the protruding portions which form the crest portions of the upper cutting edge 5a can extend far onto a plane which is substantially the same as the lower surface 3 which is the seating surface. This is the same also in the lower cutting edge 5b. Accordingly, as shown in FIG. 4, when the upper cutting edge 5a is the operative cutting edge, the protruding portions which form the crest portions of the upper cutting edge 5a extend far onto the plane which is substantially the same as the lower surface 3 which is the seating surface and therefore a seating property of the cutting insert 1 is greatly improved. That is, the clamping performance of the cutting insert 1 is improved and it is possible to prevent the cutting insert 1 from moving (for example, vibrating) during cutting more securely.

When machining this workpiece, the lower cutting edge 5b which is the cutting edge (the inoperative cutting edge) which is not the operative cutting edge does not interfere with cutting by the upper cutting edge 5a. This is because in the cutting insert 1, the second region portion 7b with the lower cutting edge 5b being formed on the edge extends so as to form the insert internal angle α together with the first region portion 7a with the upper cutting edge 5a being formed on the edge (see FIG. 3 and FIG. 13A). Although the insert internal angle α has an angle of less than 180°, the insert internal angle α may be set such that the inoperative cutting edge does not interfere with cutting by the operative cutting edge. Although it is possible that the insert internal angle α is an angle of not less than 90° and less than 180°, for example, the insert internal angle α can be an angle of not less than 120° and not more than 170°.

In addition, in the peripheral side surface 4, portions other than the inclined portions 8a, 9a is made as a surface which is substantially perpendicular to the upper surface 2 and the lower surface 3. That is, the main side surface portion 7 or the like which configures the flank is made as the surface which is substantially perpendicular to the upper surface 2 and the lower surface 3. This facilitates production of the cutting insert 1 so as to have the 180° rotational symmetric shape with respect to the axis 6b. However, this does not exclude that each of the portions of the peripheral side surface other than the inclined portions is made as an inclined surface.

If another cutting edge 5b is not formed on a portion of the lower surface 3 opposite to the upper cutting edge 5a which is the operative cutting edge as in the cutting insert 1, there will be a tendency that the main side surface portion related to these cutting edges 5 gets longer. Thereby, there is a problem that an arrangement space for the cutting insert is increased. However, as aforementioned, on the basis of making the contour shape of the cutting insert 1 substantially fan-like, it is possible to make short the circumferential lengths of other side surface portions while sufficiently ensuring the length of the main side surface portion related to the cutting edges. Therefore, the size of the insert seat of the cutting tool 21 can be reduced and the degree of freedom of arrangement of the cutting insert 1 in the cutting tool 21 can be improved.

Further, in the cutting tool 21 of this embodiment, in addition to the cutting insert 1, the second cutting insert 20 can be arranged. Accordingly, the cutting tool 21 of this embodiment can perform from rough machining of the outer periphery of the screw to finish machining of the thread groove by one-time cutting machining, and the machining efficiency is high. The second cutting insert 34 of the present embodiment has the round contour shape in the end surface, is hardly chipped and is suited for rough machining. However, the shape of the second cutting insert is not limited to such a disc shape. In addition, the application of this second cutting insert 34 is not limited to rough machining. The cutting insert 34 may be used or configured as the one for finish machining of the radial dimension of the screw. Otherwise, the second cutting insert 34 may be configured as, for example, an insert for pre-processing for threading.

In the above-mentioned cutting insert 1, the cutting edge 5 was formed by the plurality of protruding portions. Such a threading insert 1 is also called a chaser and so forth. The protruding portion of the main side surface portion may form at least one finishing edge. That is, the plurality of protruding portions are arranged at the pitch of the thread groove to be machined and may be configured such that they act in order on the workpiece starting from the forward protruding portion in the feeding direction of the cutting tool and the edge by the last protruding portion performs finish cutting of the thread groove. In this case, a direction going from the finishing edge toward the intermediate finishing edge and the roughing edge which are other protruding portions is the front side of the feeding direction F.

The above-mentioned cutting insert 1 is applied to various cutting tools and can be utilized for cutting machining of screws of a metal material, a tubing material and so forth by mounting the cutting tool onto a machine tool. Incidentally, although the cutting tool 21 of the embodiment has been made as the cutting tool for the lathe, the application of the cutting insert of the present invention is not limited to this. For example, the cutting insert according to the present invention is also applicable to a rotary cutting tool. The rotary cutting tool for cutting machining of the thread groove is also called a threading cutter and so forth.

The cutting insert, the tool body and the cutting tool according to the present invention are not limited to the above-mentioned embodiment and so forth. It does not matter if, for example, the cutting insert according to the present invention is made as a cutting insert for threading of a polygonal end surface shape such as a substantially parallelogram shape, a substantially triangular shape and so forth having four or six cutting edges 5. In association therewith, although since in the above-mentioned cutting insert 1, the end-surface view contour shape thereof is substantially the fan-like shape, the insert internal angle β between the first region portion 7a which is the first side surface portion and the sub side surface portion 8 which is the second side surface portion is acute, the insert internal angle β between the first side surface portion and the second side surface portion can be set to an optional value of less than 180° (larger than 0°). That is, the first side surface portion and the second side surface portion can have an optional relative positional relation other than that they extend on the same plane. From the viewpoint of the clamping performance of the cutting insert by engagement of the second side surface portion of the cutting insert with the side wall surface of the insert seat, preferably, an upper limit of the insert internal angle β may be set to be not more than 150°, preferably to be not more than 120°, more preferably to be less than 90°. A lower limit of the insert internal angle β may be set from the viewpoint of the strength of the cutting insert, may be not less than 45° and more preferably not less than 60°. In addition, the workpiece is not limited to metal.

Although, in the foregoing, the embodiment and so forth according to the present invention have been described in detail to some extent, it should be understood that various alterations and modifications can be made. In the present invention, all of altered examples, application examples and equivalents that are embraced within the concept of the present invention which is defined by claims are included.

The invention claimed is:

1. A cutting insert for threading, comprising:
   two opposing end surfaces;
   a peripheral side surface that extends between the two end surfaces and comprises a first side surface portion and a second side surface portion which have been arranged at different positions in a circumferential direction of the peripheral side surface; and a cutting edge formed at an intersecting ridgeline portion between the first end surface of the two end surfaces and the first side surface portion in the peripheral side surface, at least a portion of the cutting edge having a shape corresponding to a thread groove, wherein the second side surface portion in the peripheral side surface has an inclined portion which enlarges outward from the side of the first end surface toward the side of the second end surface of the two end surfaces, when an axis is defined which extends between the two end surfaces and extends so as to pass through the peripheral side surface, the peripheral side surface further comprised a third side surface portion having a substantially 180° rotational symmetric relation with the first side surface portion with respect to the axis, and a fourth side surface portion having the substantially 180° rotational symmetric relation with the second side surface portion with respect to the axis, a second cutting edge having the substantially 180° rotational symmetric relation with the cutting edge as a first cutting edge with respect to the axis is formed at an intersecting ridgeline portion between the second end surface of the two end surfaces and the third side surface portion of the peripheral side surface, a first chip breaker groove is provided in the first end surface along the first cutting edge, and a second chip breaker groove is provided in the second end surface along the second cutting edge, the first side surface portion and the third side surface portion form a third insert internal angle of less than 180° between them, and the crest portion of the first cutting edge is displaced from the second chip breaker groove in the circumferential direction, and the crest portion of the second cutting edge is displaced from the first chip breaker groove in the circumferential direction.

2. The cutting insert according to claim 1, wherein the inclined portion of the second side surface portion and the second end surface define an acute first insert internal angle between them.

3. The cutting insert according to claim 1, wherein the second side surface portion is apart from the first side surface portion in the circumferential direction.

4. The cutting insert according to claim 1, wherein on a plane defined so as to be orthogonal to an insert thickness direction, a second insert internal angle which is defined between the second side surface portion and the first side surface portion is acute.

5. The cutting insert according to claim 1, wherein the cutting edge has a plurality of crest portions arranged at a fixed pitch along the intersecting ridgeline portion between the first end surface and the first side surface portion, and each of the plurality of crest portions is shaped in order to form the thread groove.

* * * * *